United States Patent
Sato (10) Patent No.: US 7,633,975 B2
(45) Date of Patent: Dec. 15, 2009

(54) SYNCHRONIZATION CIRCUITRY WRITING TEST DATA IN A SHIFT REGISTER IN A SHORT TIME PERIOD

(75) Inventor: Tokio Sato, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 291 days.

(21) Appl. No.: 11/896,820

(22) Filed: Sep. 6, 2007

(65) Prior Publication Data
US 2008/0069153 A1 Mar. 20, 2008

(30) Foreign Application Priority Data
Sep. 19, 2006 (JP) ............................. 2006-252840

(51) Int. Cl.
*H04J 3/06* (2006.01)
(52) U.S. Cl. ..................... 370/509; 370/503; 370/412
(58) Field of Classification Search ......... 370/389–390, 370/412–429, 503–520
See application file for complete search history.

(56) References Cited

U.S. PATENT DOCUMENTS 6,072,783 A * 6/2000 Riley ........................... 370/294

2002/0122435 A1* 9/2002 Mundkur et al. ............. 370/503
2005/0201399 A1* 9/2005 Woodward et al. ........... 370/412

FOREIGN PATENT DOCUMENTS

JP 06-141056 5/1994

* cited by examiner

*Primary Examiner*—Phuc H Tran
(74) *Attorney, Agent, or Firm*—Studebaker & Brackett PC; Donald R. Studebaker (57) ABSTRACT

Synchronization circuitry includes a switcher controlled by a central processing unit to select either received data or an output of the last stage of a shift register to input the selected data to the input of the first stage of the shift register. The central processing unit is able to write test data to the shift register in a short time, so that the shift register can test block synchronization and frame synchronization by shifting CPU data in response to a clock signal. The synchronization circuitry is therefore capable of performing a synchronous operation with a 16-bit shift clock signal, so that it can shorten the time required for design and tests.

10 Claims, 9 Drawing Sheets

| NUMBER OF TIMES OF DATA WRITING | CONTENTS OF REGISTERS BICSFT(577) TO BICSFT(864) | CONTENTS OF REGISTERS BICSFT(299) TO BICSFT(576) | CONTENTS OF REGISTERS BICSFT(1) TO BICSFT(288) |
|---|---|---|---|
| 1 | BLK(272), BLK(1)~BLK(8) | BLK(271), BLK(272), BLK(1)~BLK(7) | BLK(1)~BLK(9) |
| 2 | BLK(9)~BLK(17) | BLK(8)~BLK(16) | BLK(10)~BLK(18) |
| 3 | BLK(18)~BLK(26) | BLK(17)~BLK(25) | BLK(19)~BLK(27) |
| ... | ... | ... | ... |
| 16 | BLK(135)~BLK(143) | BLK(134)~BLK(142) | BLK(136)~BLK(144) |
| 17 | BLK(144)~BLK(152) | BLK(143)~BLK(151) | BLK(145)~BLK(153) |
| ... | ... | ... | ... |
| 30 | BLK(261)~BLK(269) | BLK(260)~BLK(268) | BLK(262)~BLK(270) |
| 31 | BLK(270), BLK(271), BLK(272), BLK(1)~BLK(6) | BLK(269), BLK(270), BLK(271), BLK(272), BLK(1)~BLK(5) | BLK(271), BLK(272), BLK(1)~BLK(7) |
| 32 | BLK(6)~BLK(15) | BLK(7)~BLK(14) | BLK(8)~BLK(16) |

FIG.10

| NUMBER OF TIMES OF DATA WRITING | CONTENTS OF REGISTERS BICSFT(1) TO BICSFT(288) | CONTENTS OF REGISTERS BICSFT(577) TO BICSFT(864) | CONTENTS OF REGISTERS BICSFT(299) TO BICSFT(576) |
|---|---|---|---|
| 1 | BLK(1)~BLK(9) | BLK(272),BLK(1)~BLK(8) | BLK(271),BLK(272),BLK(1)~BLK(7) |
| 2 | BLK(10)~BLK(18) | BLK(9)~BLK(17) | BLK(8)~BLK(16) |
| 3 | BLK(19)~BLK(27) | BLK(18)~BLK(26) | BLK(17)~BLK(25) |
| ... | ... | ... | ... |
| 16 | BLK(136)~BLK(144) | BLK(135)~BLK(143) | BLK(134)~BLK(142) |
| 17 | BLK(145)~BLK(153) | BLK(144)~BLK(152) | BLK(143)~BLK(151) |
| ... | ... | ... | ... |
| 30 | BLK(262)~BLK(270) | BLK(261)~BLK(269) | BLK(260)~BLK(268) |
| 31 | BLK(271),BLK(272),BLK(1)~BLK(7) | BLK(270),BLK(271),BLK(272),BLK(1)~BLK(6) | BLK(269),BLK(270),BLK(271),BLK(272),BLK(1)~BLK(5) |
| 32 | BLK(8)~BLK(16) | BLK(6)~BLK(15) | BLK(7)~BLK(14) |

SYNCHRONIZATION CIRCUITRY WRITING TEST DATA IN A SHIFT REGISTER IN A SHORT TIME PERIOD

BACKGROUND OF THE INVENTION

1. Field of the Invention

The present invention relates to synchronization circuitry that receives data to be employed in a mobile FM (Frequency Modulation) multiplex broadcasting system to establish synchronization.

2. Description of the Background Art

Conventionally, some synchronization circuitry is used which receives data, particularly frame data constructed with a plurality of blocks, which is employed in mobile FM multiplex broadcasting systems to establish block synchronization and frame synchronization.

In such frame data, the first 16 bits of each block represents a block identity code (BIC). Each block has one of plural kinds of BICs, for example, one of four BICs: BIC1, BIC2, BIC3, and BIC4.

It is known that the block identity code occupies the first 16 bits of one block. If a block identity code is detected by checking received data bits one by one, the bit numbers in one block of received data bits are found and therefore block synchronization can be determined according to the bit numbers. For example, in the case where the number of block synchronization backward protection stages is three, if block identity codes can be detected from the three consecutive blocks it may be determined that block synchronization has been established.

There are cases where block identity codes vary between their blocks. In the case where the arrangement of blocks in one frame is fixed, the position at which a block identity code changes to another different block code, i.e. the block number of a frame change point is also fixed. Every time a block identity code is detected from received data, a change pattern from the previously detected block identity code is obtained. Therefore, since the block number of a frame change point can be obtained based on the change pattern, frame synchronization can be determined according to the block numbers of frame change points.

Conventional synchronization circuitry is operative by 16-kbit/sec clock signals for FM multiplex broadcasting, and therefore the data transmission rate of received data is 16 kbit/sec. When receiving one frame of data which contains 272 blocks each consisting of 288 bits, such synchronization circuitry may have a shift register of 864 bits to store received data. This shift register is able to store blocks of data corresponding to the number of block synchronization backward protection stages, for instance, three blocks of received data.

Such synchronization circuitry is provided with as many BIC comparators as the block synchronization backward protection stages, for example, three BIC comparators. The BIC comparators receive one data bit at a time from three blocks of the shift register, and compare 16 consecutive data bits with reference block identity codes to determine whether or not the data bits coincide with any of the reference block identity codes. If the number of inconsistent bits between them is within an allowable number of errors, they may be considered to coincide with each other.

The synchronization circuitry is also provided with a block synchronizer that generates a block synchronous signal in response to the comparison results of the three BIC comparators. If the number of block synchronization backward protection stages is three, when the three comparison results coincide with block identity codes at the same time, the block synchronizer determines that block synchronization has been established. The synchronization circuitry has a block counter that counts a bit number in response to a clock signal. The block identity code is 16 bits, and therefore if a count value of "17" is set to the block counter when block synchronization is established, the block counter can obtain correct block count values corresponding to bit numbers thereafter.

If the BIC comparator detects a block identity code, it holds the block identity code in a BIC holder. The detected block identity code is also output to a frame change detector. The frame change detector detects a change between the detected block identity code obtained from the BIC comparator and the previous block identity code held in the BIC holder. If the change coincides with a change pattern representing a frame change, it is stored in a frame change register.

The synchronization circuitry further has a frame synchronizer that generates a frame synchronous signal in response to the change pattern obtained from the frame change register. If the number of frame protection stages is two, the frame synchronizer detects whether or not two consecutive change patterns stored in the register are arranged in the order of block number. If they are arranged in order, the frame synchronizer determines that frame synchronization has been established.

The synchronization circuitry has a frame counter that counts the number of blocks each time the block count value becomes "288". If a count value, which represents a block number corresponding to a frame change point when frame synchronization is established, is set to the frame counter, it can obtain a correct frame count value even thereafter.

In the case of testing such synchronization circuitry, the operating state of the synchronization circuitry can be confirmed by receiving test data constructed with 272 blocks each having 288 bits, and monitoring a block synchronous signal, a block count value, a frame synchronous signal, and a frame count value.

For instance, an error adder disclosed in Japanese patent laid-open publication No. 141056/1994 is of a type incorporated into a digital radio receiver, and can test the error correcting function and the synchronous detection and protection function of the receiver by adding error bits to a received signal or rendering a frame synchronous pattern erroneous.

There are situations where the synchronization circuitry tests block synchronization, using an allowable error bit number for a block identity code as a parameter, or tests frame synchronization, using a frame changing point between block identity codes as a parameter. Tests must be performed not only when reception conditions are good, but also even when they are bad. However, it is fairly difficult for conventional synchronization circuitry to perform tests when reception conditions are bad.

In the case where the number of block synchronization protection stages is three, it is necessary to detect three block identity codes, so that at least two blocks and one block identity code, i.e. 592 data bits (=288×2+16) are necessary. Since the data transmission rate in conventional synchronization circuitry is 16 kbit/sec, the test of one block requires 37 msec. Because one frame consists of 272 blocks, the test of frame synchronization requires about 10 sec. Therefore, when various conditions are considered together, an extremely long test time becomes necessary.

SUMMARY OF THE INVENTION

It is an object of the present invention to provide synchronization circuitry that is capable of performing tests in a short period of time.

In accordance with the present invention, there is provided synchronization circuitry for use in a receiver for receiving data in the form of frame including a plurality of blocks each having a block identity code, the data being employed in a mobile FM multiplex broadcasting system. The synchronization circuitry of the present invention comprises a storage device having a plurality of stages for storing the data and operative in response to a clock signal to shift the data stored stage by stage, a comparator for obtaining the data stored at predetermined one of the plurality of stages as a target comparison data, and comparing the target comparison data with a reference block identity code to detect a block identity code, a block synchronizer for determining block synchronization based on the block identity code detected by the comparator, a frame synchronizer for determining frame synchronization based on the block identity code detected by the comparator, a switcher for selecting either received data or an output of the last one of the plurality of stages, as input data which is input to first one of the plurality of stages, and a controller for generating a control signal which causes the received data to be the input data in the case of normal operation and causes the output of the last stage to be the input data in the case of test operation, and feeding the control signal to the switcher. The aforementioned controller writes test data to the storage device in the case of test operation.

According to the synchronization circuitry of the present invention, the shift register can select either received data or an output of the last stage shifted in the register and input the selected data to the first stage of the register. In addition, the controller or CPU is able to write test data to the shift register in a short time, so that the shift register can test block synchronization and frame synchronization by shifting CPU data in response to a clock signal. Besides, the synchronization circuitry of the present invention is capable of performing a synchronous operation with a 16-bit shift clock signal, so that it can shorten the time required for design and tests of the synchronization circuitry.

The synchronization circuitry of the present invention is capable of further reducing the test data generated by the CPU from 288 bits per block to 32 bits, dividing the storage area of the shift register into areas each corresponding to nine blocks, and storing the test data on each area while shifting one block at a time, thereby reducing the time required for design and tests.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
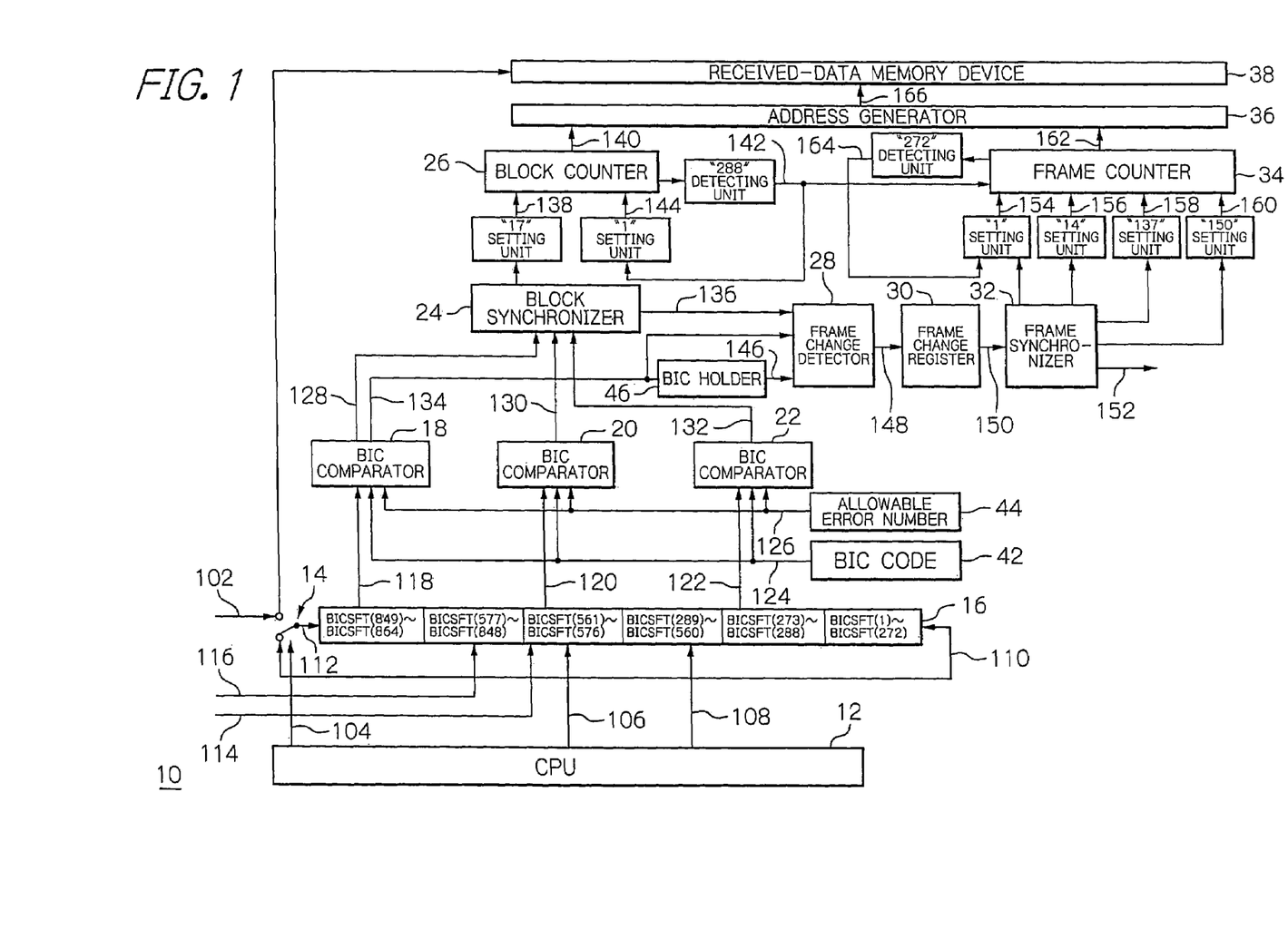
FIG. 1 is a schematic block diagram showing an embodiment of synchronization circuitry according to the present invention.

With reference to the accompanying drawings, a preferred embodiment of synchronization circuitry according to the present invention will hereinafter be described in detail. For example, the synchronization circuitry, generally designated by a reference numeral 10, includes, as shown in FIG. 1, a switcher 14 and a shift-right register 16 controlled by a central processing unit (CPU) 12 so as to cause the switcher 14 to select either received data or the output of the last stage of the shift register 16 to deliver the selected data to the input of the first stage of the shift register 16.

In the present embodiment, the synchronization circuitry 10 is configured to obtain the block identity code of each block of received data from the shift register 16, make comparisons by BIC (Block Identity Code) comparators 18, 20, and 22, determine block synchronization by a block synchronizer 24 based on the comparison results, and count a bit number in one block of the received data by a block counter 26 in timed with the block synchronization. The synchronization circuitry 10 is also configured to detect a BIC change by a frame change detector 28, store the change in a frame change register 30, determine frame synchronization by a frame synchronizer 32 based on the frame change, and count the block number of each frame by a frame counter 34 in timed with the frame synchronization.

The synchronization circuitry 10 is further configured to generate a destination address by an address generator 36 according to the count values of the block counter 26 and frame counter 34, and write the received data to this address location in a received-data memory device 38. It is noted that parts or elements not directly relevant to understanding of the present invention will neither be described nor shown for avoiding redundancy.

The synchronization circuitry 10 is advantageously applied, for example, to FM (Frequency Modulation) multiplex broadcasting transmitter-receivers and is capable of establishing synchronization of data received in broadcasting transmitter-receivers, particularly synchronization of received frame data in which a block identity code is added to the top position of each of a plurality of blocks constituting a frame.

Figure 2:
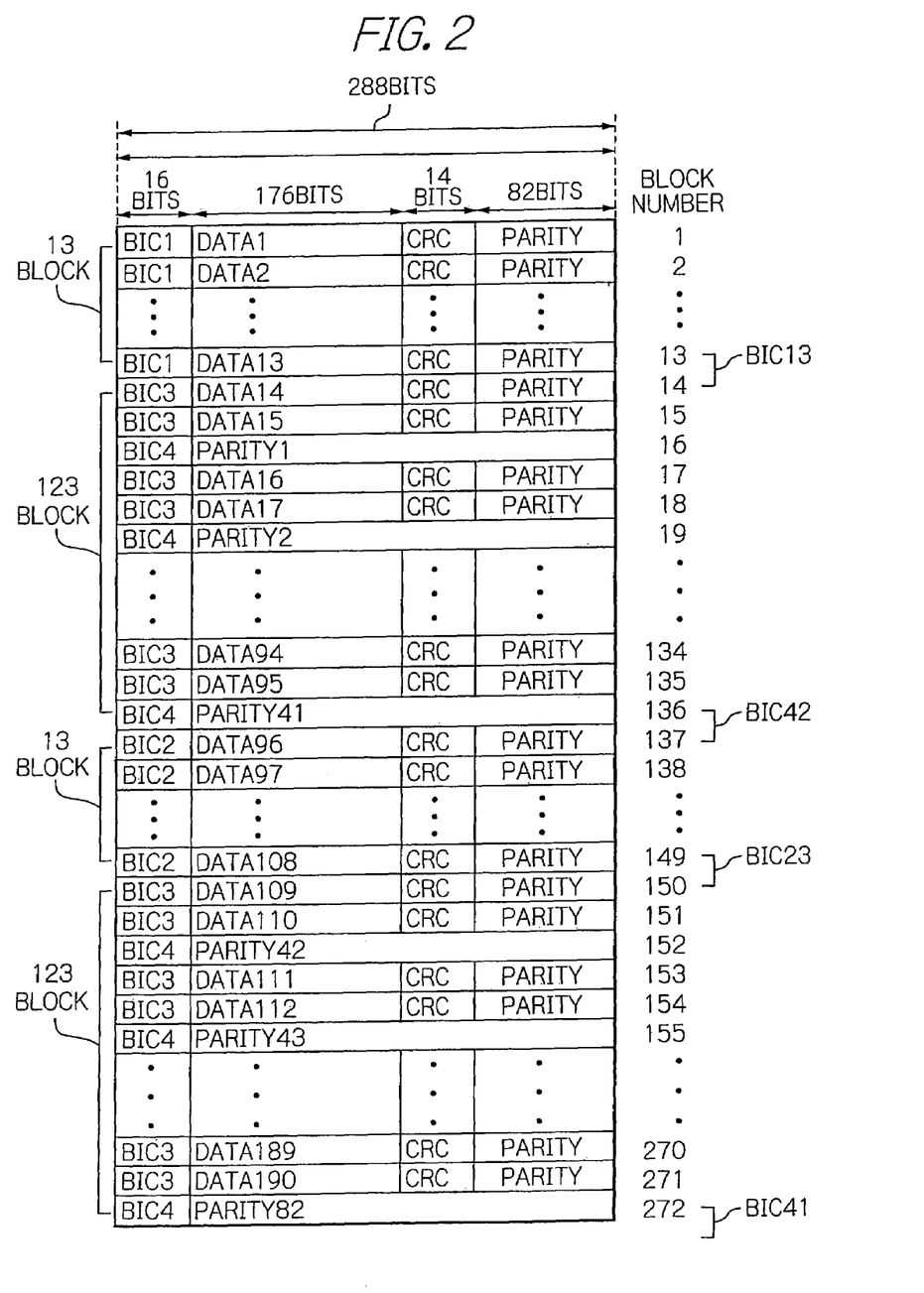
FIG. 2 shows an example of frame data employed in mobile FM multiplex broadcasting systems.

In the case of testing the synchronization circuitry 10, the synchronization circuitry 10 is able to input, as received data, frame data such as shown in FIG. 2, and monitor and confirm a block synchronization output signal 136, a frame synchronization output signal 152, a block count value 140, and a frame count value 162.

The CPU 12 has the function of generally controlling the operation of the entire synchronization circuitry 10. Particularly, in the present embodiment, the CPU 12 performs control by means of a control signal 104 and a write signal 106 that are respectively fed to the switcher 14 and shift register 16. For instance, the CPU 12 feeds the switcher 14 with the control signal 104 representing its low level as the synchronization circuitry 10 is normally operated and its high level as it is tested. When the synchronization circuitry 10 is being tested, the CPU 12 further generates test data such as shown in FIG. 2 and feeds the test data to the shift register 16 as CPU data 108.

The switcher 14 is constructed to select either received data 102 or the last stage output 110 of the shift register 16 in response to the control signal 104 and input the selected data to the shift register 16 as input data 112. For example, when the control signal 104 representing its low level is input, the switcher 14 inputs the received data 102 to the shift register 16 as input data 112. On the other hand, when the control signal 104 being high is input, the switcher 14 inputs the last stage output 110 to the shift register 16 as input data 112.

The shift register 16 in the present embodiment may store as many blocks of data as the block synchronization backward protection stages. In the case where the number of stages is three and frame data with 288 bits per block as shown in FIG. 2 is input, the shift register 16 needs to be able to store up to a total of 864 bits of data. This shift register 16 is constructed to have 864 registers BICSFT(n) (where n is an integer from 1 to 864). In the present embodiment, the register BICSFT(864) represents the first stage register, while the register BICSFT(1) represents the last stage register.

The shift register 16 can cause each register BICSFT(n) to perform a shift operation in response to the clock signal 114. In the present embodiment, the clock signal 114 of 16 KHz for FM multiplex broadcasting is input.

This shift register 16 is constructed to receive the input data 112 through the switcher 14 and store the data 112 in the first stage thereof. In the present embodiment, the shift register 16 receives as input data 112 either the received data 102 or the last stage output 110 shifted in the register 16.

Figure 3:
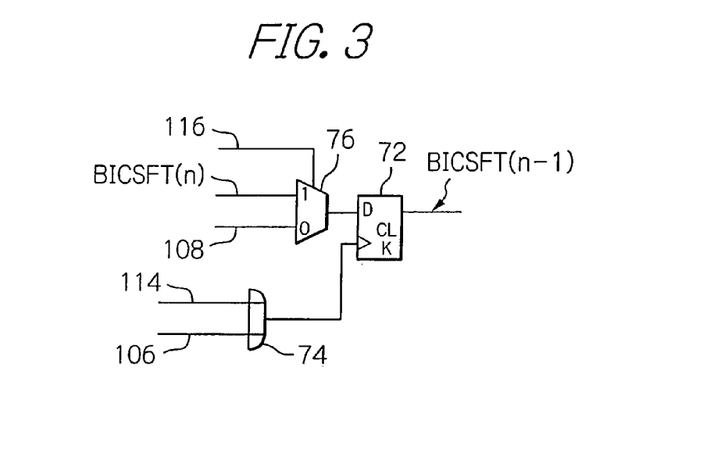
FIG. 3 is a schematic block diagram showing part of the shift register of the synchronization circuitry of the embodiment shown in FIG. 1.

For example, as shown in FIG. 3, each register BICSFT(n) of the shift register 16 includes a flip-flop 72 so that the output of the register BICSFT(n) of the previous stage is shifted to the output of the register BICSFT(n−1) of the next stage. The shift register 16 may have as many flip-flops 72 as the number of registers BICSFT(n).

The shift register 16 receives a clock signal 114 or a write signal 106 through an OR circuit 74 as a clock signal that causes the flip-flop 72 to operate. The shift register 16 also selects the output of the previous stage register BICSFT(n) or CPU data 108 by a selector 76 in response to a shift enable signal 116 synchronized to the clock signal 114 and inputs the selected data to the D input of the flip-flop 72. The shift register 16 may receive the write signal 106 by which 16 bits of data are written at a time to the 16 registers BICSFT. That is, the shift register 16 is responsive to each of the write signals 106 to receive the 16 bits of data at intervals different from 16 registers BICSFT to 16 registers BICSFT.

For instance, when the shift enable signal 116 representing its high level is input, the selector 76 outputs the output of the register BICSFT(n) of the previous stage to the flip-flop 72. On the other hand, when the shift enable signal 116 representing its low level is input, the selector 76 outputs the CPU data 108 to the flip-flop 72. More specifically, when the shift enable signal 116 representing its low level is input, the shift register 16 operates to write the CPU data 108 to the flip-flops 72 in response to the write signal 106.

The BIC comparators 18, 20, and 22 are constructed to obtain target comparison data 118, 120, and 122 from the shift register 16 in response to a clock signal 114, e.g. every time one bit of received data is input to the shift register 16, compare them with reference block identity codes 124 that correspond to the original data, and feed respective comparison results 128, 130, and 132 to the block synchronizer 24.

The BIC comparators 18, 20, and 22 in the present embodiment respectively obtain target comparison data 118, 120, and 122 of one bit from, for example, registers BICSFT(864), BICSFT(576), and BICSFT(288), determine by comparison whether or not 16 data bits of target comparison data coincide with the reference block identity code 124 which is BIC1, BIC2, BIC3, or BIC4, and output comparison results 128, 130, 132 which represent the high level thereof as they coincide with each other and the low level thereof in the case other than. The synchronization circuitry 10 may have a BIC register 42 which holds the reference block identity code 124.

The BIC comparators 18, 20, and 22 can also receive an allowable number of errors 126. If the number of inconsistent bits between each of the target comparison data 118, 120, and 122 and the reference block identity code 124 is equal to or less than the allowable error number 126, the comparators 18, 20, and 22 consider them to be consistent with each other and output comparison results 128, 130, and 132 representing the high level thereof. The synchronization circuitry 10 may have an allowable error number register 44 that holds the allowable error number 126.

Particularly, when the target comparison data 118 being the current data bits is consistent with the reference block identity code 124 to detect the block identity code, the comparator 18 writes the detected block identity code 134 to the BIC holder 46 and also feeds it to the frame change detector 28.

The block synchronizer 24 is constructed to generate a block synchronous signal 136 in response to the comparison results 128, 130, and 132 and feed the signal 136 to the frame change detector 28. For example, when the comparison results 128, 130, and 132 are all high, the block synchronizer 24 determines that block synchronization has been established, and generates the block synchronous signal 136 representing its high level. At the same time, the block synchronizer 24 feeds to the block counter 26 a count value 138 indicating a value of "17". In the case other than that, the block synchronizer 24 generates a block synchronous signal 136 representing its low level.

The synchronization circuitry 10 may further include a "17" setting unit constructed to set a count value 138 indicating a value of "17" to the block counter 26 in response to the block synchronous signal 138 representing its high level.

The block counter 26 is constructed to count the number of bits of one block in received data. In the present embodiment, the block counter 26 counts 288 bits that are contained in one block in the target comparison data 118 input to the comparator 18, and feeds its block count value 140 to an address generator 36.

The block counter 26 in the present embodiment normally counts from "1" to "288" in response to the clock signal, but if the count value 138 representing "17" is set from the block synchronizer 24, the block counter 26 can count a bit number in accordance with block synchronization. When the count value of the counter 26 represents "288", the counter 26 feeds to the frame counter 34 a carry signal 142 representing its high level. In response to the carry signal 142 representing its high level, a count value 144 indicating "1" is set to the block counter 26.

The synchronization circuitry 10 may include a "288" detecting unit which outputs a carry signal 142 representing its high level if it detects a count value indicating "288". The synchronization circuitry 10 may further include a "1" setting unit which sets to the block counter 26 a count value 144 indicating "1" in response to the carry signal 142 representing its high level.

The frame change detector 28 is constructed to determine whether or not a change between the previous block identity code 146 held in the BIC holder 46 and the current block identity code 134 from the BIC comparator 18 is a frame change and, when a frame change is detected, store its change pattern 148 in a frame change register 30. The detector 28 may operate to detect a frame change only when the block synchronous signal 136 from the block synchronizer 24 represents its high level.

In the present embodiment, the frame change detector 28 detects as a frame change (change pattern) of the frame data as shown in FIG. 2 a change from BIC4 to BIC1 (BIC41), a change from BIC1 to BIC3 (BIC13), a change from BIC4 to BIC2 (BIC42), or a change from BIC2 to BIC3 (BIC23). These change patterns are respectively detected when the block number of the block identity code input to the comparator 18 changes from "272" to "1", from 13 to 14, from 136 to 137, and from 149 to 150.

The frame synchronizer 32 is constructed to determine in response to a change pattern 150 obtained from a frame change register 30 whether or not frame synchronization has been established, and generate and output a frame synchronous signal 152 representing the result of the determination.

For example, in the case of the frame data as shown in FIG. 2, when the frame synchronizer 32 in the present embodiment obtains a change pattern 150 in which change patterns BIC41, BIC13, BIC42, and BIC23 are repeated in the recited order, the frame synchronizer 32 determines that frame synchronization has been established. In the case where the number of frame protection stages in the synchronization circuitry 10 is two, the frame change register 30 holds at least two change patterns 148. When the frame synchronizer 32 obtains two change patterns 150 and detects these patterns in prescribed order, for example, in the order of BIC42 and BIC23, the frame synchronizer 32 may determine that frame synchronization has been established.

When frame synchronization is established, the frame synchronizer 32 sets the number of a block at the frame changing time in the latest change pattern 148 (i.e. the number of a block having the latest block identity code detected in the BIC comparator 18) to the frame counter 34 as a count value 154, 156, 158, or 160. For instance, when the latest change pattern 148 is BIC23, the frame synchronizer 32 outputs a value "150" as a count value 160 because the latest block identity code is BIC3 and the block number is 150.

The synchronization circuitry 10 may be configured such that it has "1", "14", "137", and "150" setting units and these setting units are controlled by the frame synchronizer 32 and set count values 154, 156, 158, and 160 indicating "1", "14", "137", and "150" to the frame counter 34 in response to the establishment of frame synchronization.

The frame counter 34 is constructed to count the number of blocks contained in the frame data described above. In the present embodiment, the frame counter 34 counts the carry signal 142 of the block counter 26 from "1" to "272" and feeds a count result, i.e. a frame count value 162 to the address generator 36.

The frame counter 34 in the present embodiment is sometimes set to "1", "14", "137", or "150" by the count value 154, 156, 158, or 160 that was output from the frame synchronizer 32. Also, when the counter 34 represents 272 and receives the carry signal 142 representing its high level, it is set to the count value 154 indicating "1".

The synchronization circuitry 10 may be configured such that it has a "272" detecting unit, this detecting unit outputs a carry signal 164 representing its high level when it detects a count value of "272", and the "1" setting unit sets the count value 154 indicating "1" to the frame counter 34 in response to the carry signal 164 representing its high level.

The address generator 36 is constructed to decide an address 166 indicative of a storage location in the received data memory 38 to write received data 102 therein, in response to the block count value 140 and frame count value 162.

Figure 4:
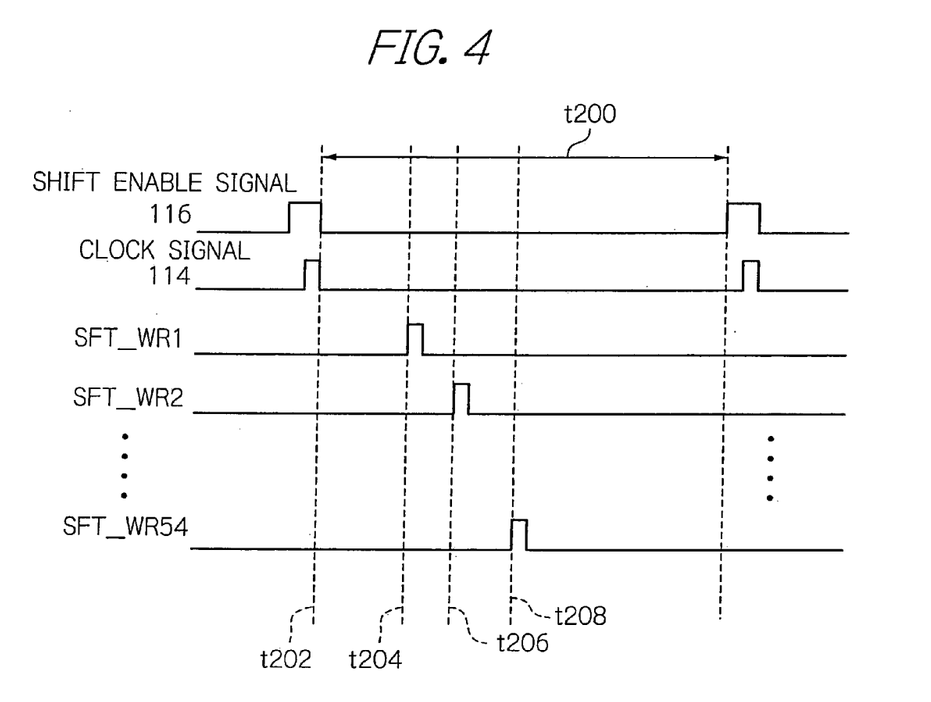
FIG. 4 is a timing chart used to explain the operational procedure of the synchronization circuitry of the embodiment shown in FIG. 1.

Now, the operation of the synchronization circuitry 10 of the illustrative embodiment will be described with reference to a timing chart of FIG. 4 directed to an example of establishing the block synchronization during test operation.

In operation of the illustrative embodiment, the CPU 12 is first controlled so that the synchronization circuitry 10 can perform a test operation, the control signal 104 representing its high level being in turn fed to the switcher 14. At the same time, the switcher 14 receives as the input data 112 of the shift register 16 the last stage output 110 shifted in the shift register 16.

The CPU 12 generates the CPU data 108 and write signal 106 required for the test operation and feeds them to the shift register 16. In this embodiment, the write signal 106 is generated so that during a predetermined time period t200 that the shift enable signal 116 is low, the CPU data 108 are written in. The CPU data 108 are input to the shift register 16 in parallel every 16 bits.

In the embodiment, 54 kinds of write signals 106 different in timing are generated so the CPU data 108 of 864 bits are written to the shift register 16 every 16 bits.

The shift enable signal 116 has been input to the selector 76 of the shift register 16, and in the embodiment, the shift enable signal 116 goes low at time t202. In response to the shift enable signal 116 that is low, the selector 76 selects the CPU data 108, which is input to the flip-flop 72.

The flip-flop 72 also receives the write signals 106 during the predetermined time period t200. These write signals 106 are different in timing every 16 registers BICSFT(n) to BICSFT(n+16) for 16 bits, that is, every 16 flip-flops 72. During the predetermined time period t200, 54 kinds of write signals 106, SFT_WR1 to SFT_WR54, are input.

In the embodiment, the first write signal SFT_WR1, which is input to the sixteen flop-flops of the registers BICSFT(864) to BICSFT(849) corresponding to the first 16 bits, goes high at time t204, so that the CPU data 108 from the selector 76 is input to the flip-flop 72.

Next, the second write signal SFT_WR2, which is input to the sixteen flop-flops of the registers BICSFT(848) to BICSFT(833) corresponding to the next 16 bits, goes high at time t206, so that the CPU data 108 from the selector 76 is input to the flip-flop 72.

In this manner, the 54 kinds of write signals 106 input to the shift register 16 go high in sequence, and finally, the 54$^{th}$ write signal SFT_WR54, which is input to the sixteen flop-flops of the registers BICSFT(16) to BICSFT(1), goes high at time t208, so that the CPU data 108 from the selector 76 is input to the flip-flop 72.

For example, if the frequency of the clock signal 114 is 16 kHz, then its one period is 1/16 KHz=62.5 μsec. Therefore, even if the write signal 106 requires 100 nsec for a single write operation, the 54 kinds of write signals 106 require only 5.4 μsec. Thus, even during the time period of one cycle of the clock signal 114, there is time enough to write the CPU data 108 to all of the registers BICSFT(864) to BICSFT(1).

Figure 5:
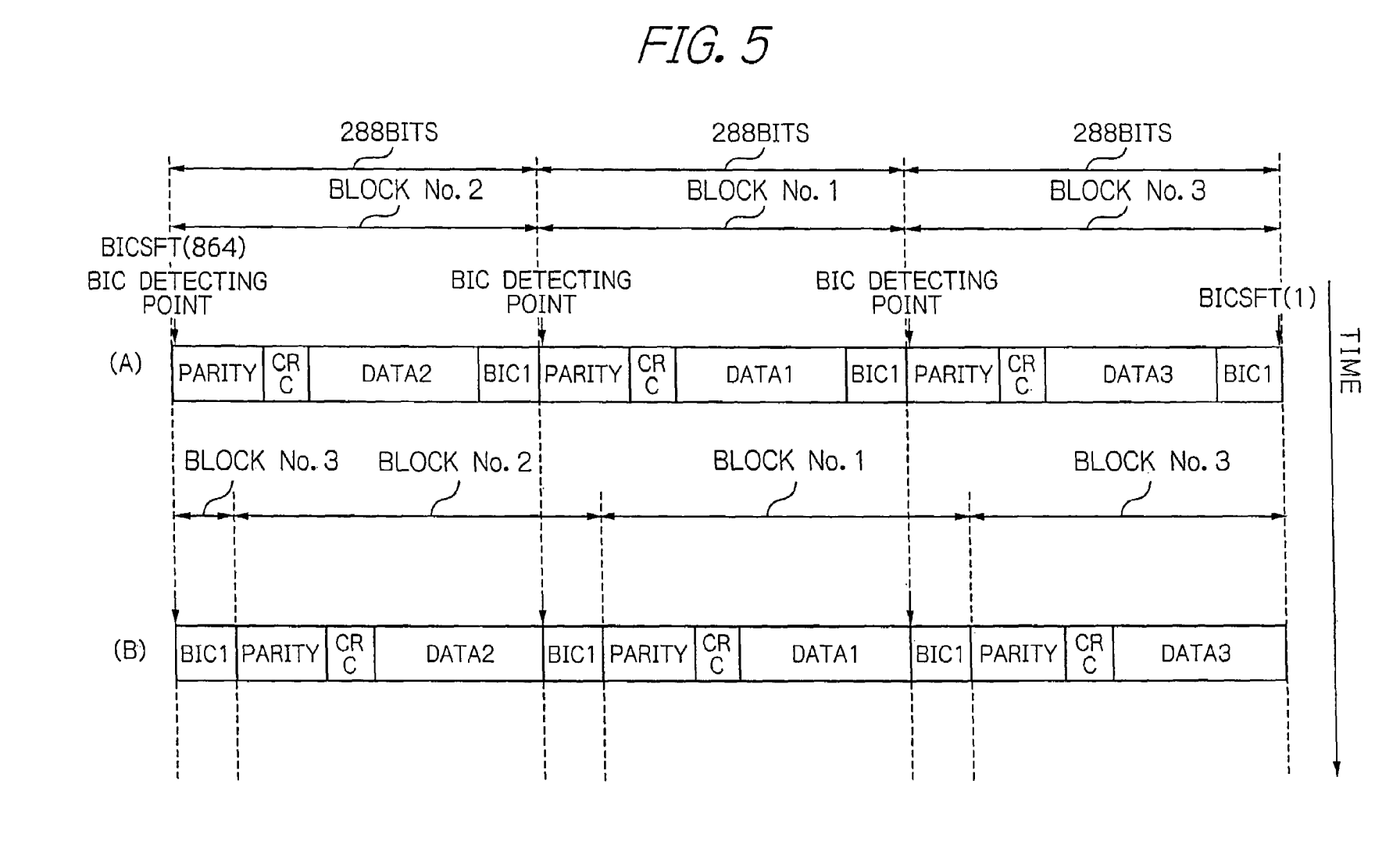
FIG. 5 shows how data stored in the shift register are shifted by the synchronization circuitry of the embodiment shown in FIG. 1.

In the manner described above, the CPU data 108 are written to the shift register 16. For instance, as shown in FIG. 5, part (A), block Nos. 2, 1, and 3 are written to the registers BICSFT(864) to BICSFT(577), registers BICSFT(576) to BICSFT(289), and registers BICSFT(288) to BICSFT(1), respectively.

At this stage, the block identity codes of the three blocks are stored in the registers BICSFT(592) to BICSFT(577), registers BICSFT(304) to BICSFT(289), and registers BICSFT(16) to BICSFT(1), but they are not stored in the register BICSFT(864), register BICSFT(576), and register BICSFT(288) where target comparison data 118, 120, and 122 are detected.

Thereafter, the data bits written to the registers BICSFT(1) to BICSFT(864) of the shift register 16 are shifted in response to the clock signal 114, and until the clock signal 114 is input 16 cycles to shift the data bits 16 times, the write signals 106 are not made high so that the CPU data 108 are not written in.

If the data bits in the shift register 16 are shifted, the last stage output 110 is input to the first stage as input data 112 so that the data bits are looped in the register 16. As a result, 16 shifts are performed as shown in FIG. 5, part (B).

If the data bits are shifted 16 times as described above, the data of one bit at the register BICSFT(864), register BICSFT(577), and register BICSFT(288) are input to the BIC comparators 18, 20, and 22 in response to the clock signal 114 as the target comparison data 118, 120, and 122. With 16 shifts in the shift register 16, consecutive data of 16 bits is obtained, and it is compared with the reference block identity code 124 to determine whether or not they are consistent with each other.

As shown in FIG. 5, part (B), if three block identity codes are obtained from three blocks, the comparators 18, 20, and 22 can obtain comparison results 128, 130, and 132 representing the high level thereof at the same time. Further, the block identity code 134 detected by the comparator 18 is fed to the BIC holder 46 and frame change detector 28 and used for frame synchronization.

Because the comparison results 128, 130, and 132 are all high, the block synchronizer 24 determines block synchronization and generates a block synchronous signal 136 that is high. At the same time, the count value 138 indicating "17" is set to the block counter 26.

After being set to "17", the block counter 26 continues to count. Particularly, after this block synchronization, the bit number in one block of the latest target comparison data 118 obtained in the BIC comparator 18 coincides with the count of the block counter 26.

As described above, the synchronization circuitry 10 is capable of determining the block synchronization. In the case of FIG. 5, parts (A) and (B), the block synchronization is established for the block No. 3. By monitoring that the block synchronous signal 136 has gone high and the count value 140 of the block counter 26 has indicated "17" immediately after synchronization, for example, if the CPU 12 reads these, a person who tests block synchronization is able to find that the block synchronization has operated normally.

In the case of testing the synchronization circuitry 10 subsequently, after the CPU data 108 has been shifted in the shift register 16 by 16 bits, the write signals 106 are input to the shift register 16 during the time the shift enable signal 116 is low, whereby the CPU data 108 can be written in. At this time, consecutive blocks shifted one block from the consecutive blocks written last time may be written as CPU data 108. That is, block Nos. 3, 2, and 4 are written to registers BICSFT(864) to BICSFT(577), registers BICSFT(576) to BICSFT(289), and registers BICSFT(288) to BICSFT(1), respectively.

Figure 6:
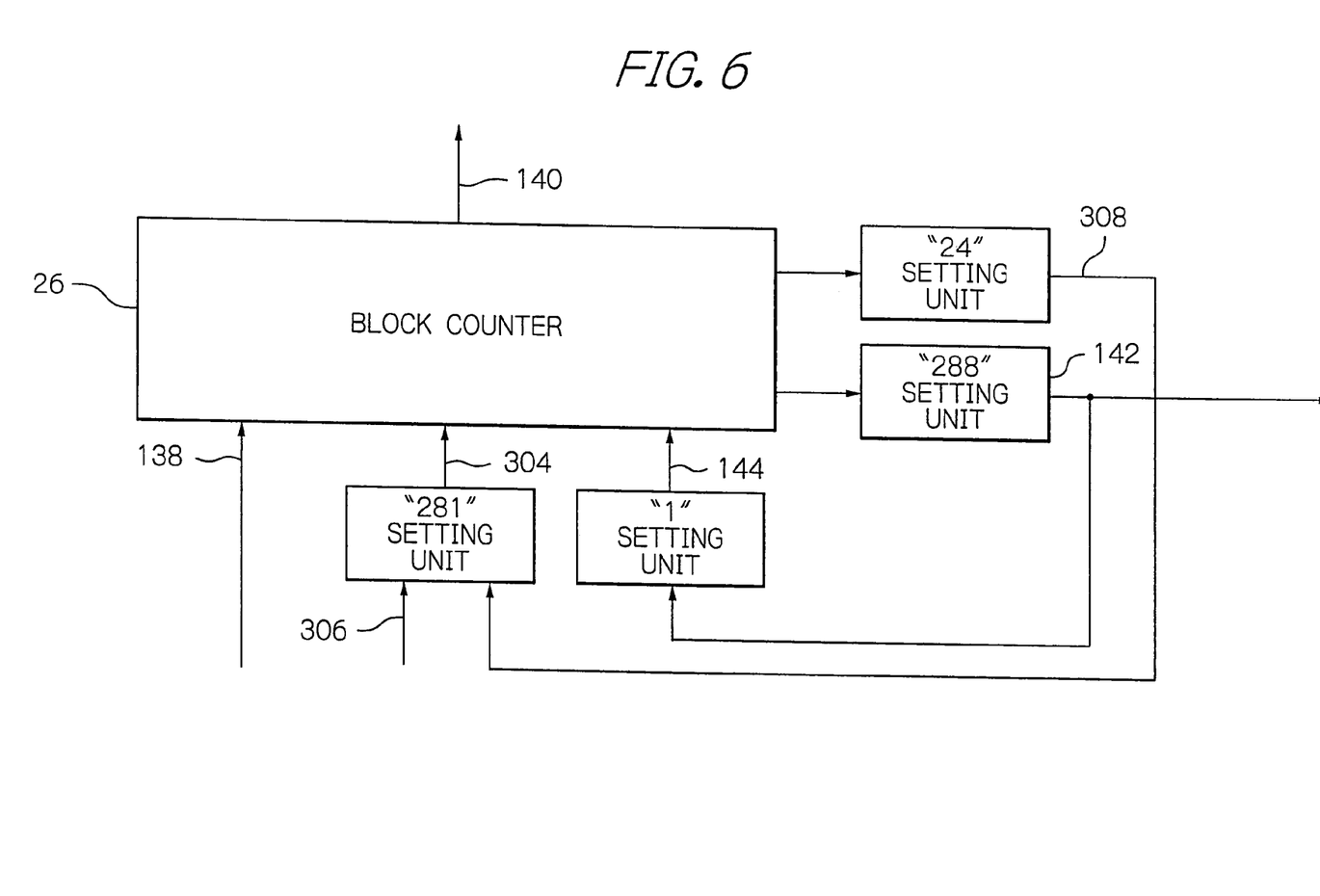
FIG. 6 is a schematic block diagram showing a block counter of an alternative embodiment of the synchronization circuitry of the present invention.

In an alternative embodiment of the synchronization circuitry 10, the CPU 12 is adapted to produce CPU data 108, using dummy blocks shorter in bit length than the original blocks. For example, the CPU 12 may be adapted to produce test CPU data 108 constructed with dummy blocks each consisting of an ordinary block identity code and dummy data bits. In this alternative synchronization circuitry 10, the number of backward bits is predetermined, and as shown in FIG. 6, if a block counter 26 detects a bit number exceeding the bit length of a block identity code, a count value 304, obtained by subtracting the predetermined number of backward bits from the bit length of the original block, is set to the block counter 26. In the following, only points differing from the previous, i.e. first, embodiment will be described.

Figure 7:
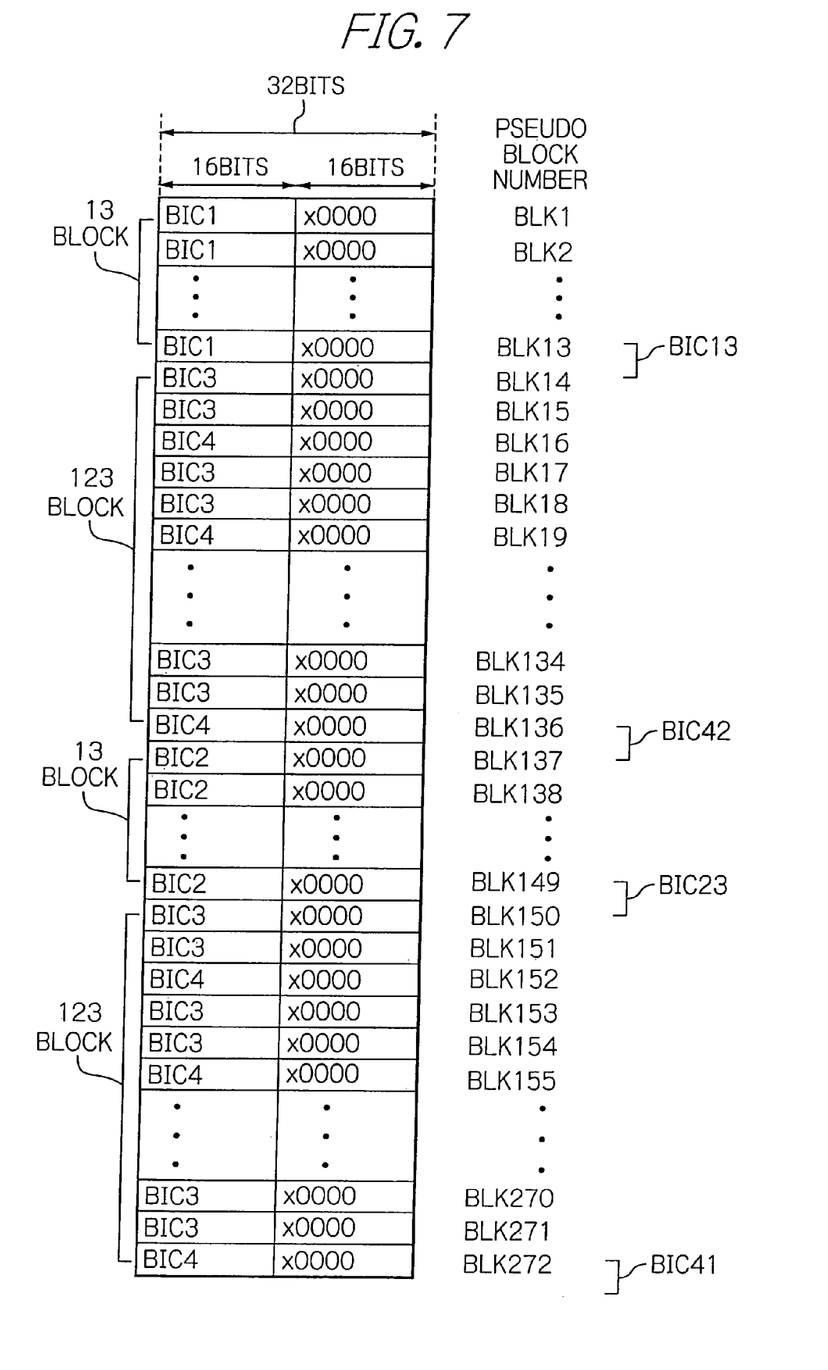
FIG. 7 shows an example of frame data employed in the synchronization circuitry of the embodiment shown in FIG. 6.

In this alternative embodiment, the CPU 12 produces, as shown in FIG. 7, CPU data 108 in which each dummy block of 32 bits consists a block identity code of 16 bits and dummy data of 16 bits. In this data 108, the first 24 bits are given bit numbers "1" through "24", as usual. Particularly, the $24^{th}$ to $32^{nd}$ bits are given bit numbers "281" though "288" so that the $25^{th}$ to $280^{th}$ bits are omitted.

However, the CPU data 108, as with the CPU data 108 shown in FIG. 2, has 272 blocks per frame, and the order of the arrangement of the block identity code in each block is the same as the data 108 shown in FIG. 2. That is, the arrangement of frame changes is the same as the data 108 shown in FIG. 2. In FIG. 7, the block numbers BLK(m) (where m is an integer from 1 to 272) are given "1" to "272".

The CPU 12 also feeds the block counter 26 with a control signal 306 representing a normal operation or test operation. For example, in the case of normal operation, the control signal 306 represents its low level. In the case of test operation, the control signal 306 represents its high level.

The number of backward bits is "8", and if the count value of the block counter 26 of the embodiment indicates "24", a count value 304 indicating "281" is set to the block counter 26.

The block counter 26 may be constructed to have a "24" detecting unit which outputs a carry signal 308 representing its high level when it detects a count value 304 of "24". The block counter 26 may also be constructed to have a "281" setting unit which sets to the block counter 26 a count value 304 of "281" in response to the carry signal 308 representing its high level.

The "281" setting unit also receives the control signal 306 from the CPU 12. When the control signal 306 represents a normal operation, that is, when it is low, the "281" setting unit does not set a count value regardless of the carry signal 308. On the other hand, when the control signal represents a test operation, i.e. when it is high, the "281" setting unit sets a count value in response to the carry signal 308.

Well, the operation of the synchronization circuitry 10 of the alternative embodiment will be described as an example of establishing the frame synchronization during test operation.

In an 864-bit shift register 16 which, as in the first embodiment, can store three blocks each having 288 bits, the CPU data 108 of the embodiment in which each block consists of 32 bits can be stored by 27 blocks. The blocks in the CPU data 108 are disposed at intervals of 32 bits and the block identity codes are also disposed at intervals of 32 bits, but BIC comparators 18, 20, and 22 are constructed to detect block identity codes from the shift register 16 at intervals of 288 bits.

In the alternative embodiment, the CPU data 108 are written to the shift register 16 so that 27 blocks in the shift register 16 are divided into three areas every nine blocks, and nine consecutive blocks are stored on each area.

Normally, the BIC comparator 18 receives the current data bits, and the block identity code detected by the BIC comparator 18 is used for frame synchronization. Accordingly, the CPU data 108 are written in so that the block identity code of the latest block of the consecutive blocks (i.e. the block identity code of the block whose block number is largest) is detected in the BIC comparator 18. In the alternative embodiment, the latest block is called a target frame synchronization block.

For example, among the blocks in the CPU data 108, the target frame synchronization block is stored in registers BICSFT (32) to BICSFT(1), a block two before the target frame synchronization block is stored in registers BICSFT (320) to BICSFT(289), and a block one before the target frame synchronization block is stored in registers BICSFT (608) to BICSFT(577). If the data bits thus stored are shifted 16 bits in the shift register 16, the block identity codes of the target frame synchronization block, the block one before the target frame synchronization block, and the block two before the target frame synchronization block are detected in the BIC comparators 18, 20, and 22, respectively.

In the alternative embodiment, in one of the three areas, nine blocks are stored in order from the target frame synchronization block number BLK(1). Next, in the second area, nine blocks are stored in order from the block number BLK(271) two before the target frame synchronization block number BLK(1). Further, in the third area, nine blocks are stored in order from the block number BLK(272) one before the target frame synchronization block number BLK(1). Accordingly, in the shift register 16, as shown in FIG. 8, part (A), block numbers BLK(1) to BLK(9) are stored in registers BICSFT (1) to BICSFT(288), block numbers BLK(271) to BLK(7) are stored in registers BICSFT(289) to BICSFT(576), and block numbers BLK(272) to BLK(8) are stored in registers BICSFT (577) to BICSFT(864).

Figure 8:
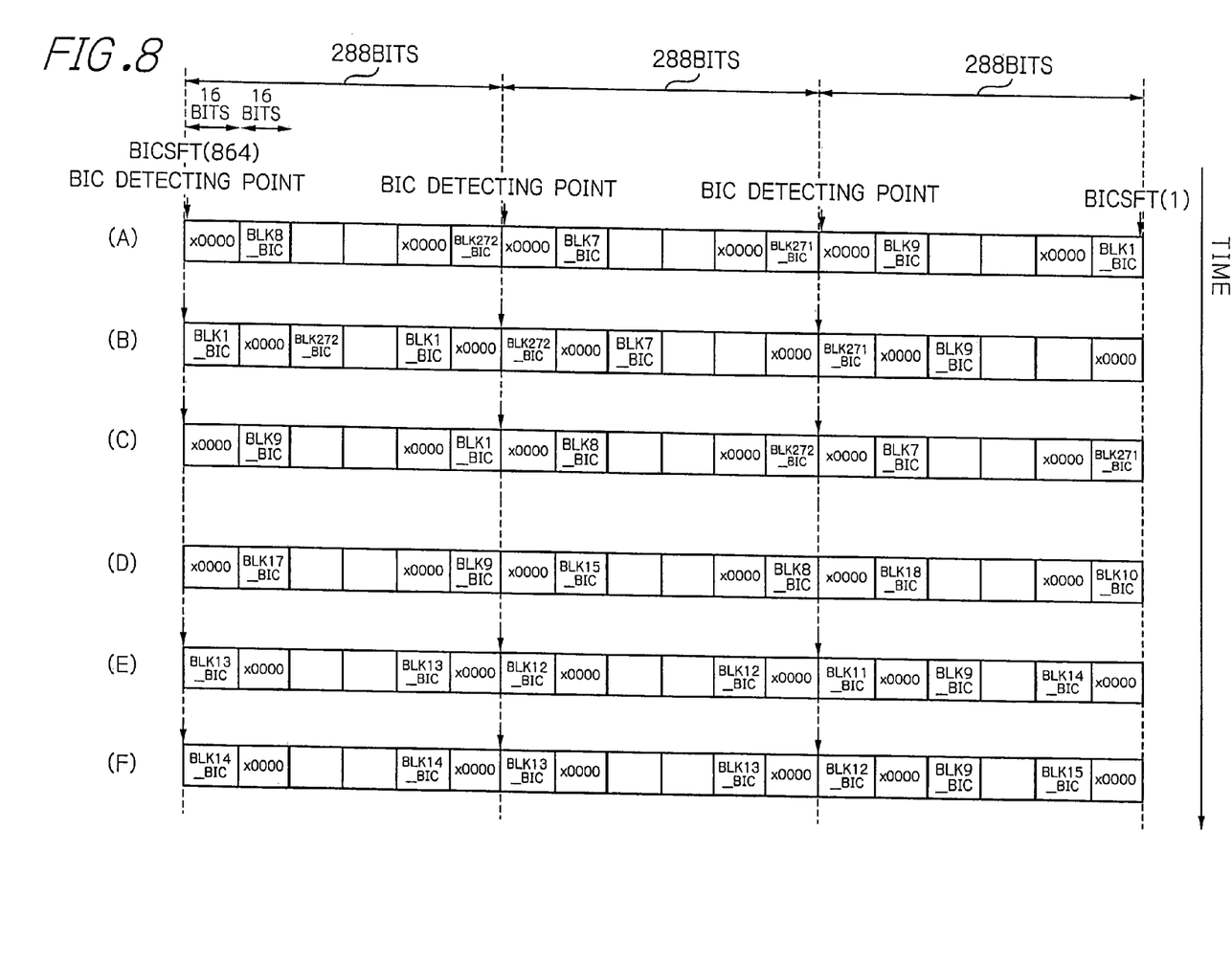
FIG. 8 shows how data stored in the shift register are shifted by the synchronization circuitry of the embodiment shown in FIG. 6.

If the data bits thus stored in the shift register 16 are shifted 16 times, as shown in FIG. 8, part (B), the block identity code of the target frame synchronization block number BLK(1) is stored in the registers BCISFT(864) to BICSFT(849), the block identity code of the block number BLK (272) one before the target frame synchronization block number BLK (1) is stored in the registers BCISFT(576) to BICSFT(561), and the block identity code of the block number BLK (271) two before the target frame synchronization block number BLK(1) is stored in the registers BCISFT(288) to BICSFT (273). At this stage, the data bits of these block identity codes are input to the BIC comparators 18, 20, and 22 as target comparison data 118, 120, and 122 at the positions of the registers BICSFT(864), BICSFT(576), and BICSFT(288), and the target comparison data of 16 consecutive bits is compared with reference block identity code 124 to determine whether or not they coincide with each other.

In the comparators 18, 20, and 22, as with the first embodiment, comparison results 128, 130, and 132 are obtained and employed for block synchronization. Particularly, in the alternative embodiment, the block identity code 134 detected in the comparator 18 is fed to a BIC holder 46 and a frame change detector 28 and is employed for frame synchronization.

In the shift register 16, the data bits are further shifted 16 times, so that the target frame synchronization block number BLK(1) is stored in the registers BCISFT(864) to BICSFT (833), the block number BLK (272) one before the target frame synchronization block number BLK(1) is stored in the registers BCISFT(576) to BICSFT(545), and the block number BLK (271) two before the target frame synchronization block number BLK(1) is stored in the registers BCISFT(288) to BICSFT(257). That is, the next target frame synchronization block number BLK(2) is stored in registers BICSFT(32) to BICSFT(1), the block number BLK(272) two before the target frame synchronization block number BLK(2) is stored in registers BICSFT(320) to BICSFT(289), and the block number BLK(1) one before the target frame synchronization block number BLK(2) is stored in registers BICSFT(608) to BICSFT(577). Therefore, if the data bits in the shift register 16 are further shifted 16 times, the block identity codes of the next target frame synchronization block number BLK(2), block number BLK(1) one before, and block number BLK (272) two before are detected in the BIC comparators 18, 20, and 22 and are compared with the reference block identity code 124.

Thus, if the data bits in the shift register 16 are shifted 32 times, the block identity code of one block is detected. Therefore, if they are shifted 288 times, all the block identity codes of the block numbers BLK(1) to BLK(9) can be detected. As shown in FIG. 8, part (C), block numbers BLK(1) to BLK(9) are stored in registers BICSFT(577) to BICSFT(864), block numbers BLK(271) to BLK(7) are stored in registers BICSFT (1) to BICSFT(288), and block numbers BLK(272) to BLK (8) are stored in registers BICSFT(289) to BICSFT(576).

Next, in the shift register 16, as shown in FIG. 8, part (D), target frame synchronization block numbers BLK(10) to BLK(18) shifted by 9 blocks are stored in registers BICSFT (1) to BICSFT(288), the block numbers BLK(8) to BLK(16) two before are stored in registers BICSFT(289) to BICSFT (576), and the block numbers BLK(9) to BLK(17) one before are stored in registers BICSFT(577) to BICSFT(864). After they are likewise shifted 288 times, the block identity codes of the target frame synchronization block numbers BLK(10) to BLK(18) are detected in the BIC comparator 18.

Figure 9:
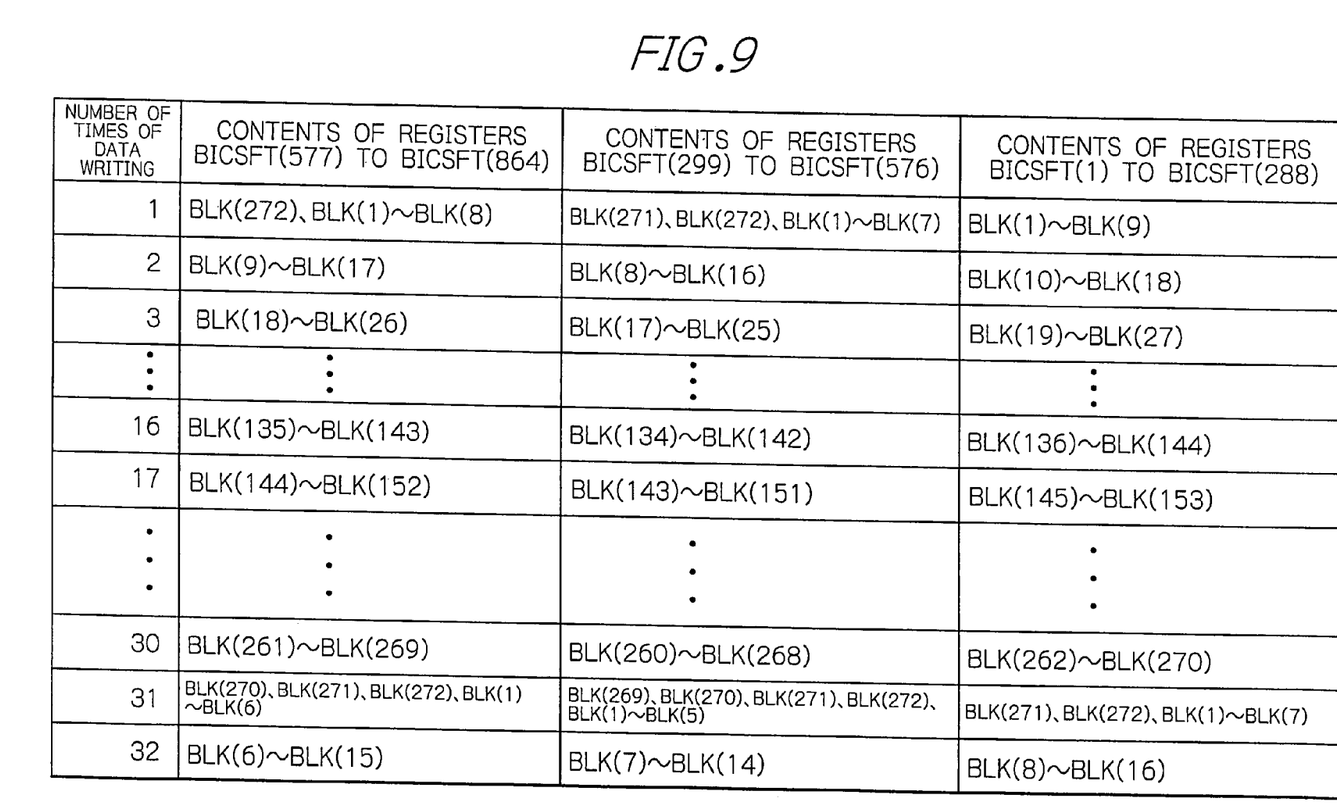
FIG. 9 shows on a table the relationship between the number of times that data was written in and the block numbers stored at the register positions of the shift register of the synchronization circuitry of the embodiment shown in FIG. 6.
Figure 10:
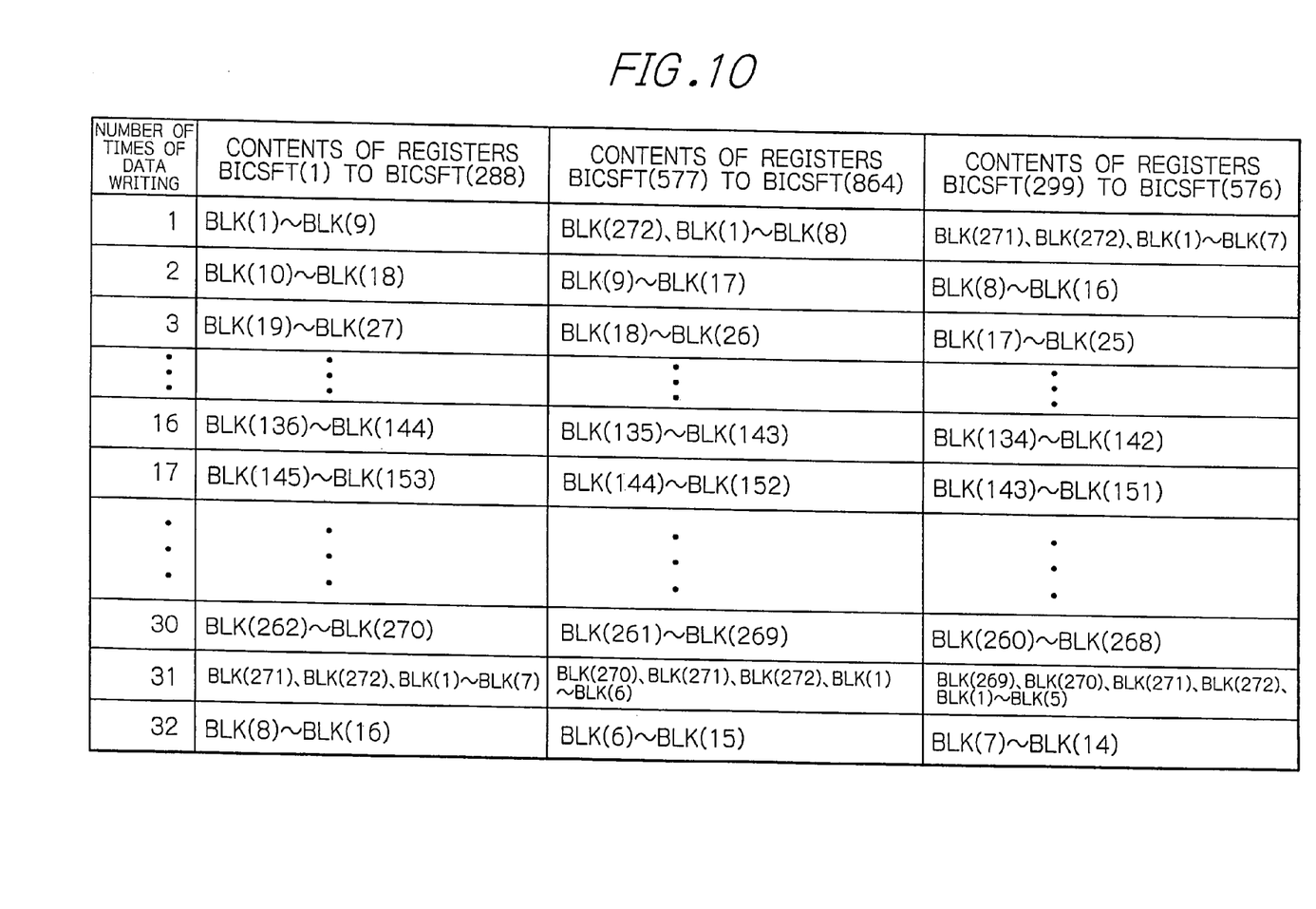
FIG. 10 shows on a table the relationship between the number of times that data was written in and the block numbers obtained after the data bits in the shift register shown in FIG. 9 have been shifted 288 times.

Thus, in the shift register 16, if storage of the CPU data 108 and 288 shifts are repeated at least 31 times with nine target frame synchronization blocks being shifted at a time, the block identity codes of all of the block numbers BLK(1) to BLK(272) are detected in the BIC comparator 18. In FIG. 9, there is shown the relationship between the number of times that the CPU data 108 was written to the shift register 16 and the block number BLK (m) stored in the registers BICSFT(n) of the shift register 16. In FIG. 10, there is shown the relationship between the number of times that the CPU data 108 was written in and the block numbers BLK (m), obtained after the data bits in the shift register 16 shown in FIG. 9 have been shifted 288 times.

As shown in FIG. 8, part (D), when target frame synchronization blocks are block numbers BLK(10) to BLK(18), if the data bits in the shift register 16 are shifted 112 times {=3 blocks (3×32 times) and 16 times}, the blocks are stored as shown in FIG. 8, part (E). At this stage, the block identity code of the block number BLK(13) is stored in the register BICSFT (864) and detected in the BIC comparator 18. The detected block identity code 134 is fed to the BIC holder 46 and frame change detector 28.

If the data bits in the shift register 16 are further shifted 32 times, the blocks are stored as shown in FIG. 8, part (F). At this stage, the block identity code of the block number BLK (14) is stored in the register BICSFT (864) and detected in the BIC comparator 18. The detected block identity code 134 is fed to the BIC holder 46 and frame change detector 28.

At this stage, not only the block identity code 134 of the block number BLK(14) from the BIC comparator 18 but the block identity code 146 of the previous block number BLK (13) from the BIC holder 46 is input to the frame change detector 28. The block identity code 146 of the block number BLK(13) is BIC1 and the block identity code 134 of the block number BLK(14) is BIC3, so that a frame change pattern 148 of BIC13 is detected and written to the frame change register 30.

The next frame change after the frame change BIC13, as shown in FIG. 7, is BIC42, which is detected as the block number BLK(136) changes to the block number BLK(137). The block number BLK(136) and block number BLK(137), as shown in FIG. 9, are blocks written to the shift register 16 for the $16^{th}$ time.

If the CPU data 108, containing these block numbers BLK (136) and BLK(137), is written to the shift register 16, during 16 shifts of the data bits, the block identity code of the block number BLK(136) is detected in the BIC comparator 18 and fed to the BIC holder 46 and frame change detector 28. Next, in the shift register 16, by further shifting the data bits 16 times, one shift of one block is completed. During further 16 shifts, the block identity code of the block number BLK(137) is detected in the BIC comparator 18 and fed to the BIC holder 46 and frame change detector 28.

At this stage, not only the block identity code 134 of the block number BLK(137) from the BIC comparator 18 but the block identity code 146 of the block number BLK(136) from the BIC holder 46 is input to the frame change detector 28. The block identity code 146 of the block number BLK(136) is BIC4 and the block identity code 134 of the block number BLK(137) is BIC2, so that a frame change pattern 148 of BIC42 is detected and written to the frame change register 30.

The frame change patterns BIC13 and BIC42 held in the frame change register 30 are determined in the frame synchronizer 32. For example, in the case where the number of frame protection stages is two, it is determined whether or not two frame change patterns occur in order. In the frame synchronizer 32, the frame change patterns BIC13 and BIC42 are consecutive, so that frame synchronization is determined to have been established and the frame synchronous signal 152 representing its high level is output. In the frame synchronizer 32, if frame synchronization is established, the latest block No. 137 is set to the frame counter 34 as a count value 158.

In the frame counter 34, a block number is obtained by counting the carry signal 142 from the block counter 26. Particularly, after the frame synchronization, the count value coincides with the number of the block given the block identity code that is detected in the BIC comparator 18.

Besides, the CPU data 108 written to the shift register 16 for the $17^{th}$ time contains the block number BLK(149) and block number BLK(150) having block identity codes BIC2 and BIC3, so that the frame change detector 28 detects a frame change pattern 148 of BIC23. The CPU data 108 written to the shift register 16 for the $31^{st}$ time contains the block number BLK(272) and block number BLK(1) having block identity codes BIC4 and BIC1, so that the frame change detector 28 detects a frame change pattern 148 of BIC41.

The entire disclosure of Japanese patent application No. 2006-252840 filed on Sep. 19, 2006, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. Synchronization circuitry for use in a receiver for receiving data in a form of frame including a plurality of blocks each having a block identity code, the data being employed in a mobile FM (Frequency Modulation) multiplex broadcasting system, said circuitry comprising:
   a storage device having a plurality of stages for storing the data and operative in response to a clock signal to shift the data stored stage by stage;
   a comparator for obtaining the data stored at predetermined one of the plurality of stages as target comparison data, and comparing the target comparison data with a reference block identity code to detect a block identity code;
   a block synchronizer for determining block synchronization based on the block identity code detected by said comparator;
   a frame synchronizer for determining frame synchronization based on the block identity code detected by said comparator;
   a switcher for selecting either received data or an output of last one of the plurality of stages, as input data which is input to first one of the plurality of stages; and
   a controller for generating a control signal which causes the received data to be the input data in a case of normal operation and causes the output of the last stage to be the input data in a case of test operation, and feeding the control signal to said switcher,
   said controller writing test data to said storage device in the case of test operation.

2. The circuitry in accordance with claim 1, wherein, in the case of test operation, said controller inputs and writes the test data to said storage device in parallel.

3. The circuitry in accordance with claim 2, wherein, in the case of test operation, said controller generates a write signal by which the test data is written to said storage device 16 bits at a time, and feeds the write signal to said storage device so that the test data to be employed in a single test operation is written during one cycle of the clock signal.

4. The circuitry in accordance with claim 1, wherein, if a number of inconsistent bits between the target comparison data and the reference block identity code is less than an allowable error bit number, said comparator considers both of them to be consistent with each other, to thereby allow the allowable error bit number to be set.

5. The circuitry in accordance with claim 1, further comprising:
   a holder for holding the block identity code detected by said comparator until at least the next block identity code is detected; and
   a frame change detector for determining whether or not a change from the block identity code held in said holder to the block identity code detected in said comparator is a frame change, and storing a change pattern of the block identity code when the change is the frame change;
   said frame synchronizer determining establishment of the frame synchronization when it detects the change patterns in order correspondingly to a number of frame protection stages, to thereby allow the change pattern representing the frame change to be set.

6. The circuitry in accordance with claim 1, wherein said comparators are provided as many as a number of block synchronization backward protection stages;
   said storage device having a capacity to store at least as many blocks of data as the number of protection stages;

said block synchronizer determining establishment of the block synchronization if said block synchronizer detects the block identity code of blocks that are consecutive by the number of protection stages.

7. The circuitry in accordance with claim 6, wherein said controller writes, in the case of test operation, to said storage device the test data in which a block identity code is added to a head of each block as an original block.

8. The circuitry in accordance with claim 7, wherein, in the case of test operation,
- said controller writes to said storage device the blocks that are consecutive by the number of block synchronization protection stages as the test data,
- said storage device shifting the stored data by a bit length of the block identity code and causing said comparator to detect a block identity code,
- writing by said controller and shifting by said storage device being repeated, and at this time said controller writing to said storage device consecutive blocks shifted by one block from consecutive blocks written last time.

9. The circuitry in accordance with claim 6, further comprising a block counter for counting a bit number in one block in response to a clock signal, and resetting a count value if the bit number reaches an original bit length of one block,
- said controller writing, in the case of test operation, test data to said storage device, the test data being constructed with a plurality of dummy blocks and each dummy block containing a block identity code of a predetermined bit length and dummy data,
- said block counter setting a bit number next to the bit length of the block identity code to a count value if said block synchronizer determines establishment of the block synchronization, and, in the case of test operation, determining a number of backward bits and setting, if a bit number exceeding the bit length of the block identity code is detected, a count value obtained by subtracting the number of backward bits from the original bit length of one block.

10. The circuitry in accordance with claim 9, wherein, in the case of test operation,
- said storage device has as many storage areas as the number of block synchronization protection stages, and each of the storage areas has a capacity for storing as many dummy blocks as a predetermined number of storage blocks,
- said controller writing to each of the storage areas the blocks that are consecutive by the number of protection stages, as the test data,
- in the storage areas, the next target detection blocks to blocks stored being written in order, thereby writing as many blocks as the predetermined number of storage blocks in all,
- said storage device shifting the stored data by the bit length of the block identity code and causing said comparator to detect a block identity code, further shifting the stored data by a bit length of the dummy data, and repeating the shifting to allow said comparator to detect block identity codes of all blocks written,
- writing by said controller and shifting by said storage device being repeated, and at this time said controller writing consecutive blocks shifted by the predetermined number of storage blocks from consecutive blocks written last time, to the respective storage areas.

* * * * *